(12) United States Patent
Rasras

(10) Patent No.: US 7,680,362 B2
(45) Date of Patent: Mar. 16, 2010

(54) CMOS-COMPATIBLE POLARIZATION-DIVERSE TUNABLE OPTICAL BANDPASS FILTER

(75) Inventor: Mahmoud Rasras, Berkeley Heights, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 68 days.

(21) Appl. No.: 12/014,440

(22) Filed: Jan. 15, 2008

(65) Prior Publication Data

US 2009/0180729 A1 Jul. 16, 2009

(51) Int. Cl.
  G02B 6/00 (2006.01)
  G02B 6/26 (2006.01)
  G02B 6/42 (2006.01)

(52) U.S. Cl. .......................... 385/11; 385/45

(58) Field of Classification Search .................... 385/11
See application file for complete search history.

(56) References Cited

U.S. PATENT DOCUMENTS

| | | | | |
|---|---|---|---|---|
| 6,580,534 B2* | 6/2003 | Madsen | ....................... | 398/63 |
| 6,580,842 B1* | 6/2003 | Hehlen et al. | ................... | 385/11 |
| 7,257,291 B1* | 8/2007 | Rasras | ........................... | 385/27 |
| 7,389,053 B1* | 6/2008 | Ilchenko et al. | ............. | 398/183 |
| 7,492,983 B2* | 2/2009 | Matsubara et al. | ............ | 385/14 |
| 2002/0076161 A1* | 6/2002 | Hirabayashi et al. | ............ | 385/40 |
| 2003/0194165 A1* | 10/2003 | Silberberg et al. | ............. | 385/11 |
| 2006/0268392 A1* | 11/2006 | Setti et al. | ................. | 359/337.5 |
| 2008/0013876 A1* | 1/2008 | Gill et al. | ......................... | 385/1 |
| 2008/0219614 A1* | 9/2008 | Gill et al. | ......................... | 385/3 |
| 2009/0092350 A1* | 4/2009 | Gill | ............................... | 385/3 |

OTHER PUBLICATIONS

S.T. Chu et al., entitled "Compact Full C-Band Tunable Filters for 50 GHz Channel Spacing Based on High Order Micro-Ring Resonators," Optical Society of America, 2004 (3 pages).
M.S. Rasras et al., entitled "Demonstration of a Fourth-Order Pole-Zero Optical Filter Integrated Using CMOS Processes," J. Lightwave Technology, 2007, v. 25, pp. 87-92.

* cited by examiner

Primary Examiner—Uyen-Chau N Le
Assistant Examiner—Rhonda S Peace
(74) Attorney, Agent, or Firm—Mendelsohn, Drucker & Associates, P.C.; Yuri Gruzdkov; Steve Mendelsohn

(57) ABSTRACT

According to one embodiment, an optical filter has a polarization rotator and two instances of an optical bandpass filter (OBPF). The first instance of the OBPF processes a TE-polarized component of an optical input signal to produce a first filtered signal. The polarization rotator then transforms the TE polarization of the first filtered signal into the TM polarization. The polarization rotator also transforms the polarization of a TM-polarized component of the optical input signal into the TE polarization. The second instance of the OBPF processes the resulting TE-polarized signal to produce a second filtered signal. The first and second filtered signals having TM and TE polarizations, respectively, are then combined to produce a filtered output signal.

20 Claims, 8 Drawing Sheets

100

300

400

400
AA

500

500
AA

600

600
AA

700

CMOS-COMPATIBLE POLARIZATION-DIVERSE TUNABLE OPTICAL BANDPASS FILTER

BACKGROUND OF THE INVENTION

1. Field of the Invention

The present invention relates to optical communication equipment and, more specifically, to tunable optical bandpass filters.

2. Description of the Related Art

This section introduces aspects that may help facilitate a better understanding of the invention(s). Accordingly, the statements of this section are to be read in this light and are not to be understood as admissions about what is in the prior art and/or what is not in the prior art.

Tunable optical bandpass filters find applications in optical power and performance monitors, broadcast and select networks, add/drop multiplexers, etc. Implementing such filters with standard silicon complementary-metal-oxide-semiconductor (CMOS) technology holds the promise of minimizing production costs, e.g., through monolithic integration of electronic and photonic functions and the use of the massive existing CMOS manufacturing infrastructure. As a result, CMOS-compatible tunable optical bandpass filters are currently being actively developed.

SUMMARY OF THE INVENTION

According to one embodiment of the invention, an optical filter has a polarization rotator and two instances of an optical bandpass filter (OBPF). The first instance of the OBPF processes a TE-polarized component of an optical input signal to produce a first filtered signal. The polarization rotator then transforms the TE polarization of the first filtered signal into the TM polarization. The polarization rotator also transforms the polarization of a TM-polarized component of the optical input signal into the TE polarization. The second instance of the OBPF processes the resulting TE-polarized signal to produce a second filtered signal. The first and second filtered signals having TM and TE polarizations, respectively, are then combined to produce a filtered output signal. Advantageously, the optical filter can function as a widely tunable polarization-diverse bandpass filter and is amenable to implementation in CMOS technology.

According to one embodiment, an optical device has a first optical filter adapted to apply bandpass filtering to a first component of an optical input signal to produce a first filtered signal, wherein said first component has a first polarization. The optical device also has one or more polarization rotators adapted to change (i) the first polarization of the first filtered signal to a different second polarization and (ii) the second polarization of a second component of the optical input signal to the first polarization. The optical device further has a second optical filter adapted to apply bandpass filtering to the second component having the resulting first polarization to produce a second filtered signal. The first and second filtered signals are combined to produce a filtered output signal.

According to another embodiment, a method of processing optical signals has the steps of: (A) applying bandpass filtering to a first component of an optical input signal to produce a first filtered signal, wherein said first component has a first polarization; (B) changing the first polarization of the first filtered signal to a different second polarization; (C) changing the second polarization of a second component of the optical input signal to the first polarization; (D) applying bandpass filtering to the second component having the resulting first polarization to produce a second filtered signal; and (E) combining the first and second filtered signals to produce a filtered output signal.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

One problem with optical waveguides having a relatively large difference between the refractive indices of the core and cladding (often termed "high refractive-index contrast waveguides"), such as the silicon/silicon oxide waveguides of complementary-metal-oxide-semiconductor (CMOS) circuits, is that transverse electric (TE) and transverse magnetic (TM) optical polarization components have a relatively large difference in their group indices. For example, TE and TM polarization modes in silicon have group indices of about 4.1 and 2.8, respectively (or effective indices of about 2.5 and 1.7, respectively). This relatively large group-index difference makes it relatively difficult to construct a filter having a substantially polarization-independent response. Such a filter is generally referred to as a polarization-diverse filter.

Figure 1:
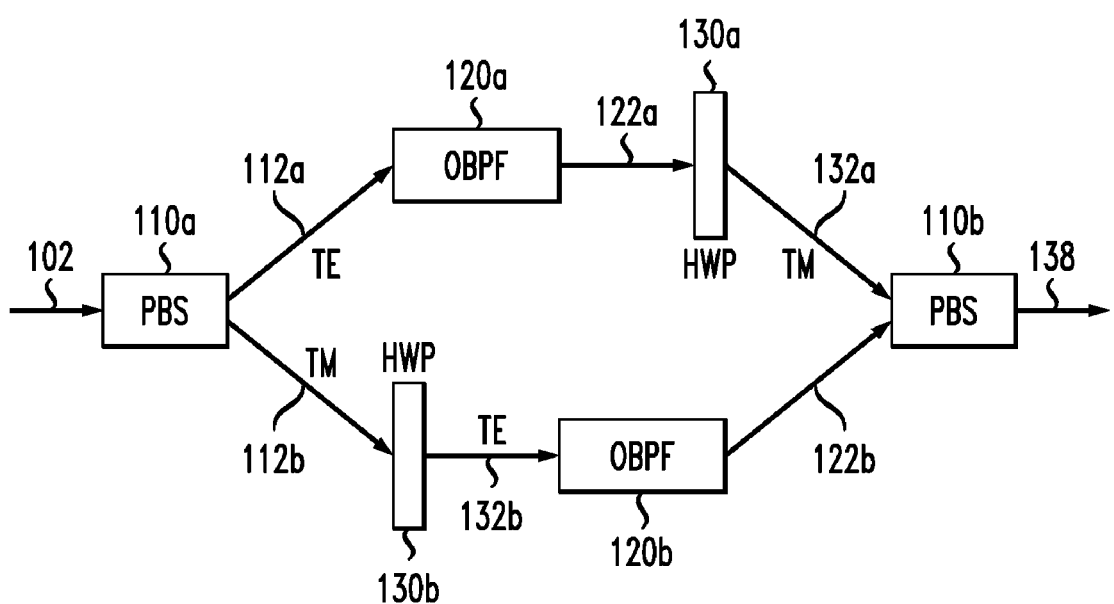
FIG. 1 shows a block diagram of an optical polarization-diverse filter according to one embodiment of the invention.

FIG. 1 shows a block diagram of an optical polarization-diverse filter 100 according to one embodiment of the invention. Filter 100 has a polarization beam splitter (PBS) 110a that splits an optical input signal 102 into two polarization components, i.e., a TE polarization component 112a and a TM polarization component 112b. TE polarization component 112a is applied to a tunable optical bandpass filter (OBPF) 120a that is specifically designed to process TE-polarized signals. OBPF 120a subjects component 112a to bandpass filtering as described in more detail below to produce a filtered TE-polarized signal 122a. Signal 122a is then applied to a half-wave plate (HWP) 130a to change its polarization from TE to TM. The resulting TM-polarized signal is labeled 132a.

TM polarization component 112b is applied to an HWP 130b to change its polarization from TM to TE. The resulting TE-polarized signal 132b is then subjected to bandpass filtering in a tunable OBPF 120b that is similar to tunable OBPF 120a. The resulting filtered TE-polarized signal is labeled 122b. Filtered TE-polarized signal 122b and filtered TM-polarized signal 132a are combined in a PBS 110b to produce a filtered optical output signal 138. PBS 110b is similar to PBS 110*a*, except that it is configured to operate as a polarization beam combiner rather than a polarization beam splitter.

Because filter 100 uses two instances of OBPF 120 configured to process TE-polarized signals, the filter can be configured to have a substantially identical filter response to both polarization components of signal 102. In addition, by subjecting each of those polarization components to polarization rotation in the corresponding one of HWPs 130*a-b*, filter 100 balances, for both polarization components, optical losses that are typically introduced by an HWP. As a result, filter 100 introduces a relatively low amount of polarization-mode-specific signal distortion. All these characteristics advantageously enable filter 100 to be implemented using CMOS technology and to function as a polarization-diverse bandpass filter.

Figure 2A:
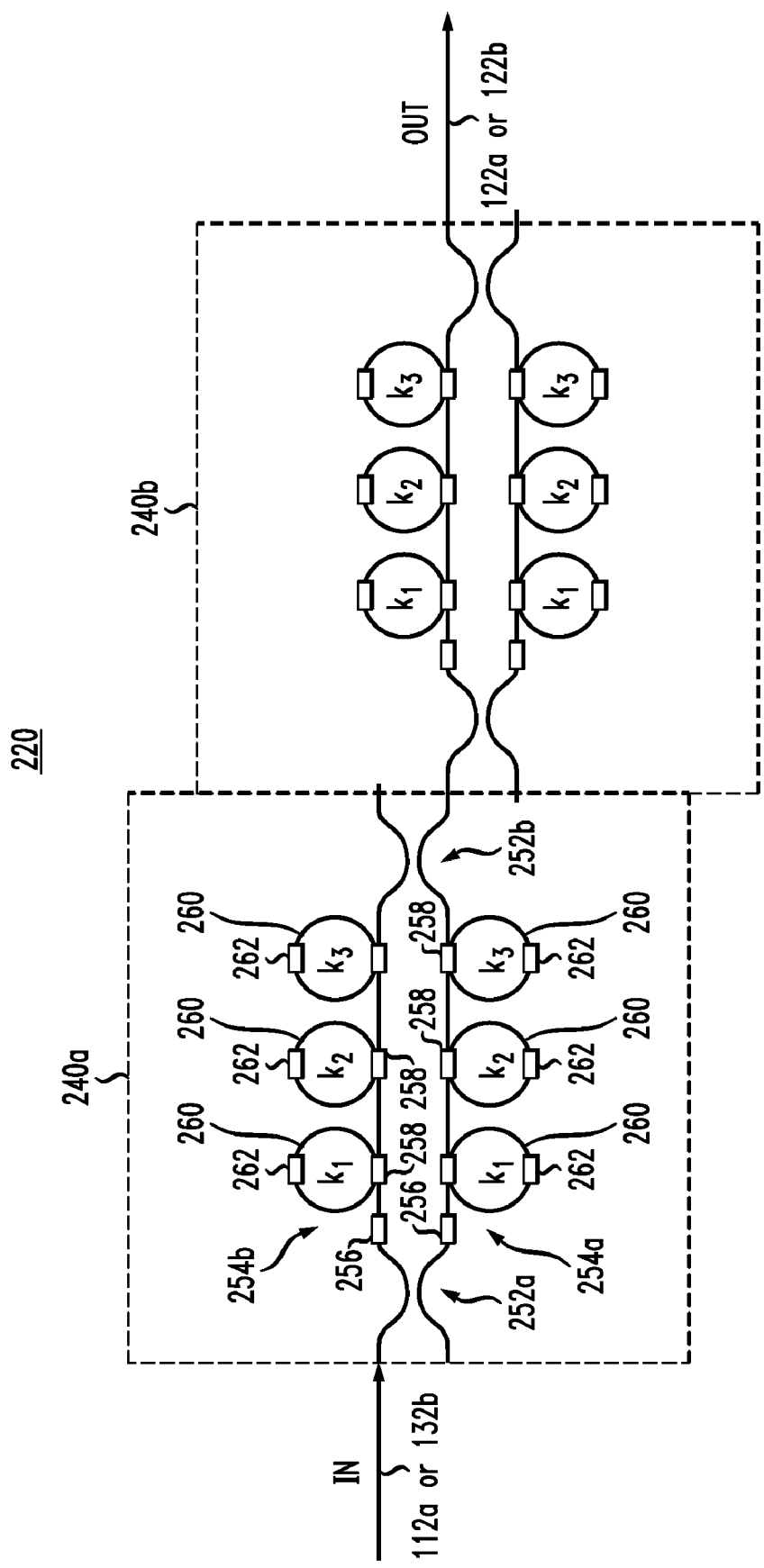
FIGS. 2A-D illustrate a tunable optical bandpass filter (OBPF) that can be used in the filter of FIG. 1 according to one embodiment of the invention.
Figure 2B:
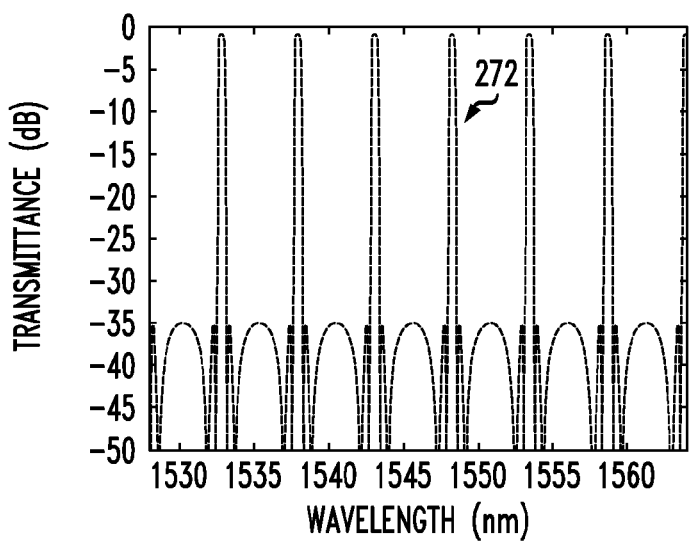
Figure 2C:
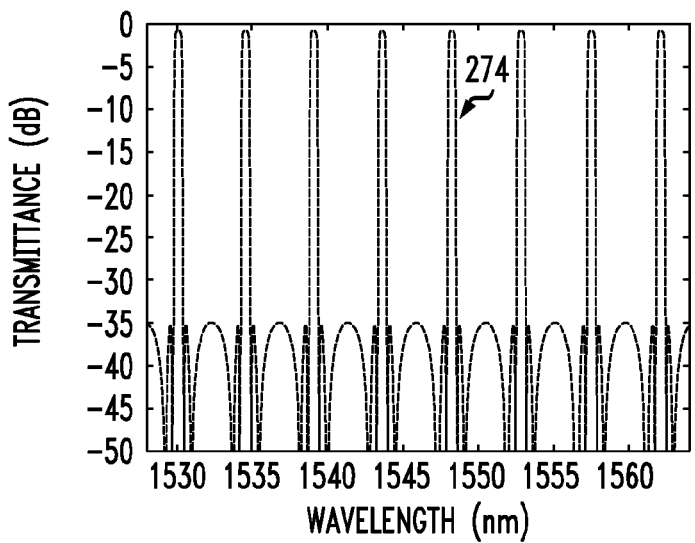
Figure 2D:
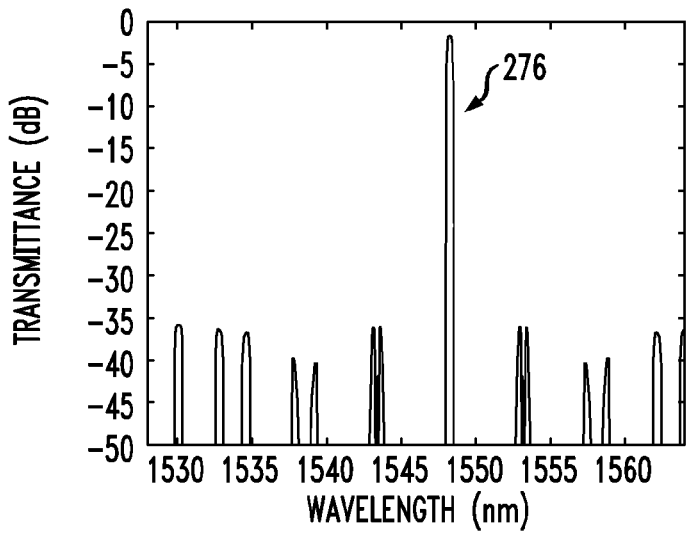

FIGS. 2A-D illustrate a tunable optical bandpass filter (OBPF) 220 that can be used as OBPF 120 according to one embodiment of the invention. More specifically, FIG. 2A shows a schematic diagram of OBPF 220. FIGS. 2B-D graphically illustrate operation principles of OBPF 220.

OBPF 220 has two sixth-order optical filters 240*a-b* serially connected in a Vernier configuration. Each optical filter 240 is composed of a Mach-Zehnder interferometer having two arms 254*a-b*, both coupled between two 3-dB optical couplers 252*a-b*. Each arm 254 has a tunable phase shifter 256 and is coupled to three resonator rings 260. The sixth order of filter 240 is determined by the total number (six) of resonator rings 260 coupled to arms 254*a-b*. Each resonator ring 260 is coupled to the corresponding arm 254 via a tunable optical coupler 258 and incorporates a tunable phase shifter 262. Optical coupler 252*a* divides the power of an input signal, e.g., signal 112*a* or 132*b* (see FIG. 1), substantially equally between arms 254*a-b*. Each ring resonator 260 of arm 254*a* is configured to have a response that is a complex conjugate of that of the corresponding ring resonator 260 of arm 254*b*. Optical coupler 252*b* serves to mix the optical signals emerging from arms 254*a-b*.

Each of FIGS. 2B-C shows a representative transmission curve of each optical filter 240*a-b*. Each transmission curve is periodic and has a comb of transmission bands, with the free spectral range (FSR) of ring resonators 260 defining the comb period or the FSR of filter 240. The spectral position of the comb of transmission bands, the FSR of filter 240, and the bandwidth of its transmission bands can be tuned by changing the coupling strengths ($k_1$, $k_2$, and $k_3$) of optical couplers 258 and the phase shifts introduced by individual phase shifters 256 and 262. For example, FIG. 2B shows a configuration, in which filter 240 has been tuned to have a comb period of about 650 GHz and to have one of the transmission bands, labeled 272, centered at about 1548.3 nm. FIG. 2C shows a different configuration of filter 240, in which the comb period is about 575 GHz, while one of the transmission bands, labeled 274, is similarly centered at about 1548.3 nm.

One skilled in the art will appreciate that the use of sixth-order filters 240 in filter 220 is merely exemplary and that similarly constructed filters of a different order can also be used therein. Additional details on the design and operation principles of optical filters incorporating Mach-Zehnder interferometers and cascaded resonator rings can be found, e.g., in an article by M. S. Rasras et al., entitled "Demonstration of a Fourth-Order Pole-Zero Optical Filter Integrated Using CMOS Processes," J. Lightwave Technology, 2007, v. 25, pp. 87-92, the teachings of which are incorporated herein by reference. In one embodiment, filter 240*a* can have a different order than filter 240*b*.

A Vernier configuration is one, in which two periodic filters having different FSRs are appropriately spectrally aligned and connected in series. For example, filters 240*a-b* of filter 220 can be configured to have the transmission curves shown in FIG. 2B-C, respectively. Then, the resulting Vernier configuration of filter 220 will produce a transmission curve shown in FIG. 2D. More specifically, due to the spectral alignment of transmission bands 272 and 274 near the same center wavelength, the transmission curve of FIG. 2D has one strong transmission band labeled 276, with the wavelengths located outside of that transmission band being substantially fully rejected. Note that the spectral position of transmission band 276 can be tuned by tuning filters 240*a-b* while keeping transmission bands 272 and 274 appropriately spectrally aligned. Additional details on various Vernier configurations that can be used in filter 220 can be found, e.g., in the following publications: W. M. Hamdy, "Crosstalk Analysis and Filter Optimization of Single and Double-Cavity Fabry-Perot Filters," IEEE Journal on Selected Areas in Communications, 1990, v. 8, pp. 1095-1107; Advanced Semiconductor Lasers and their Applications, v. 31, from the Topical Meeting of the Optical Society of America (July 1999), pp. 186-188, Editors: Hollberg, L. and Lang, R. J., Washington, D.C., USA; J-F. Lemieux et al., "Step-Tunable (100 GHz) Hybrid Laser Based on Vernier Effect between Fabry-Perot Cavity and Sampled Fibre Bragg Grating," Electronics Letters, 1999, v. 35, pp. 904-906; Y. H. Ja, "Optical Vernier Filter with Fiber Grating Fabry-Perot Resonators," Applied Optics, 1995, v. 3, pp. 6164-6167; I. P. Kaminow et al., "A Tunable Vernier Fiber Fabry-Perot Filter for FDM Demultiplexing and Detection," IEEE Photonics Technology Letters, 1989, v. 1, pp. 24-26; S. M. Lindsay et al., "Construction and Alignment of a High Performance Multipass Vernier Tandem Fabry-Perot Interferometer," Review of Scientific Instruments, 1981, v. 52, pp. 1478-1486, the teachings of all of which are incorporated herein by reference.

Figure 3:
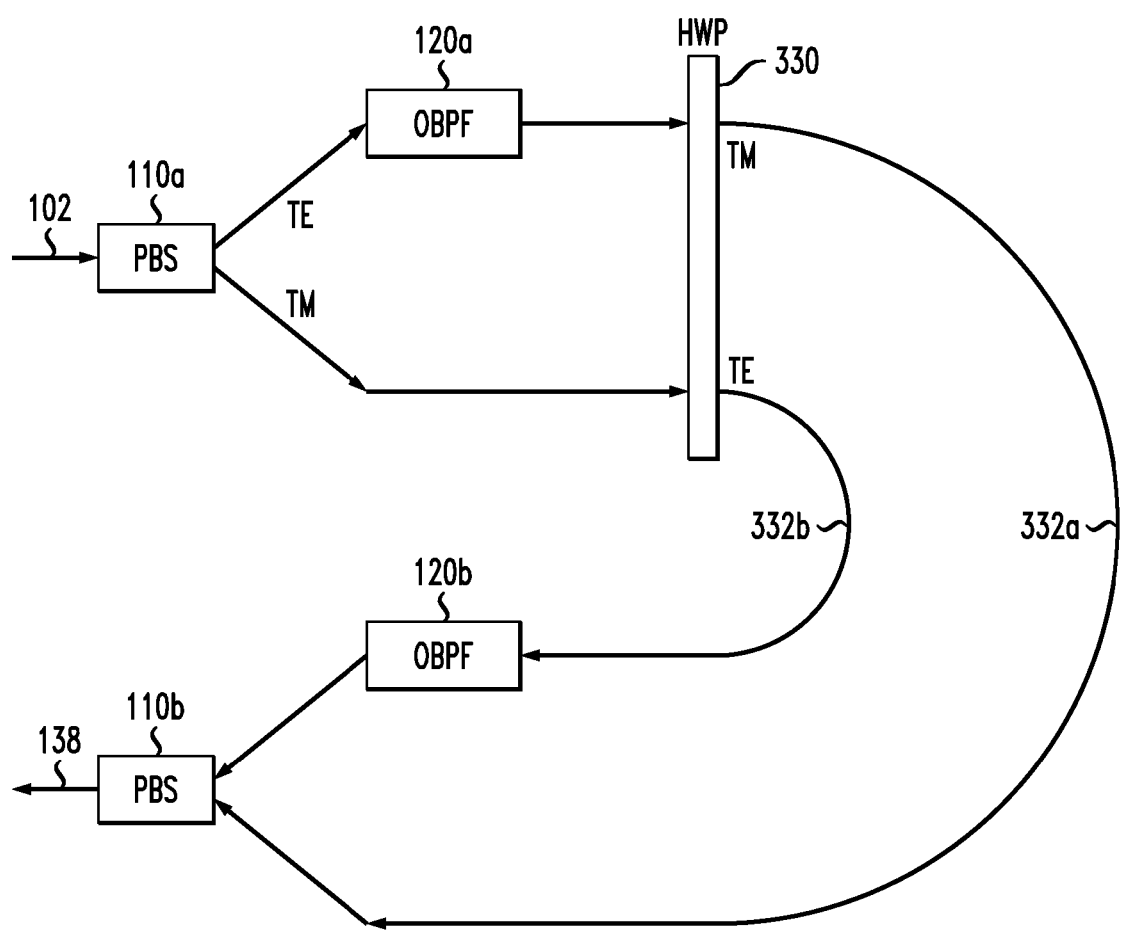
FIG. 3 shows a block diagram of an optical polarization-diverse filter according to another embodiment of the invention.

FIG. 3 shows a block diagram of an optical polarization-diverse filter 300 according to another embodiment of the invention. Filter 300 is generally similar to filter 100 (FIG. 1) and has many of the same elements. However, instead of two HWPs 130*a-b* used in filter 100, filter 300 uses a single HWP 330. Filter 300 also has a slightly different layout than filter 100. For example, input signal 102 and output signal 138 in filter 300 have different propagation directions. A change in the signal propagation direction is achieved by the use of curved waveguides 332*a-b* coupled between (i) HWP 330 and PBS 110*b* and (ii) the HWP and OBPF 120*b*, respectively.

Figure 4A:
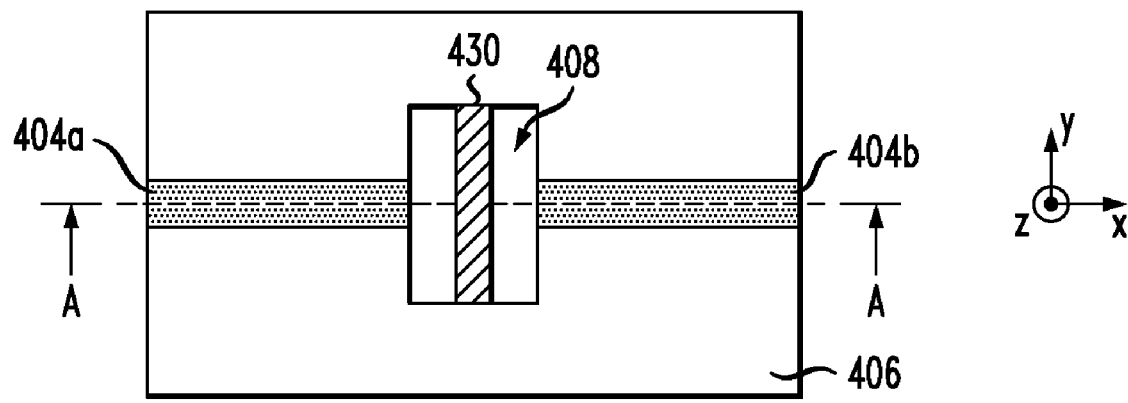
FIGS. 4A-B show top and cross-sectional views, respectively, of a polarization rotator that can be used in the filter of FIG. 1 or FIG. 3 according to one embodiment of the invention.
Figure 4B:
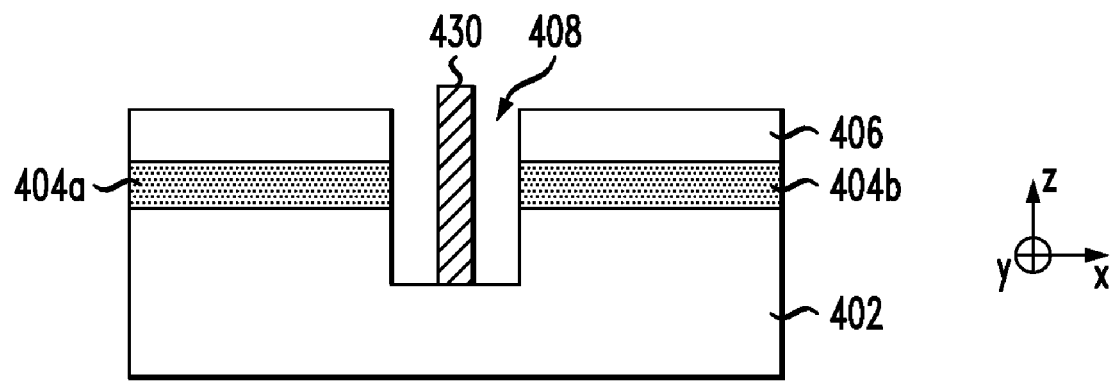

FIGS. 4A-B show top and cross-sectional views, respectively, of a polarization rotator 400 that can be used in filter 100 or 300 according to one embodiment of the invention. Polarization rotator 400 has a core region 404 (consisting of portions 404*a-b*) formed on a substrate 402 and covered on three sides by a cover layer 406. Substrate 402, core region 404, and cover layer 406 form an optical waveguide, in which the core region serves as a waveguide core and the substrate and cover layer serve as a waveguide cladding. Polarization rotator 400 further has an HWP 430 that has been inserted into a trench 408 formed in substrate 402, core region 404, and cover layer 406. HWP 430 can be used as one of HWPs 130*a-b* (FIG. 1) or in HWP 330 (FIG. 3).

A TE-polarized beam emerging out of core-region portion 404*a* into trench 408 undergoes a polarization rotation in HWP 430 and then couples into core-region portion 404*b* as a TM-polarized beam. Similarly, a TM-polarized beam emerging out of core-region portion 404*a* undergoes a polarization rotation in HWP 430 and then couples into core-region portion 404*b* as a TE-polarized beam. In one embodiment, core region 404 is made of silicon; substrate 402 and cover layer 406 are made of silicon oxide; and HWP 430 is made of a birefringent material. In one embodiment, polarization rotator 400 is implemented as a planar waveguide circuit, with the dominant plane of the circuit being parallel to the XY plane.

Figure 5A:
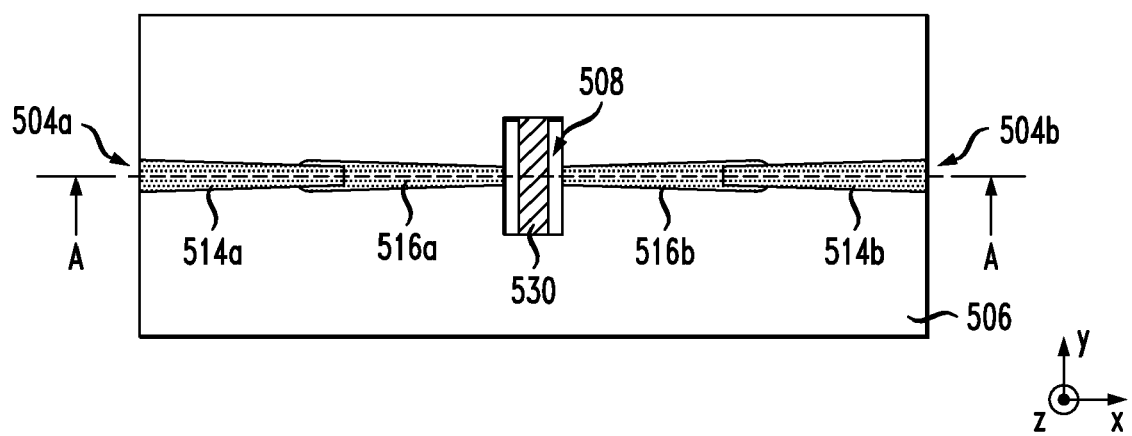
FIGS. 5A-B show top and cross-sectional views, respectively, of a polarization rotator that can be used in the filter of FIG. 1 or FIG. 3 according to another embodiment of the invention.
Figure 5B:
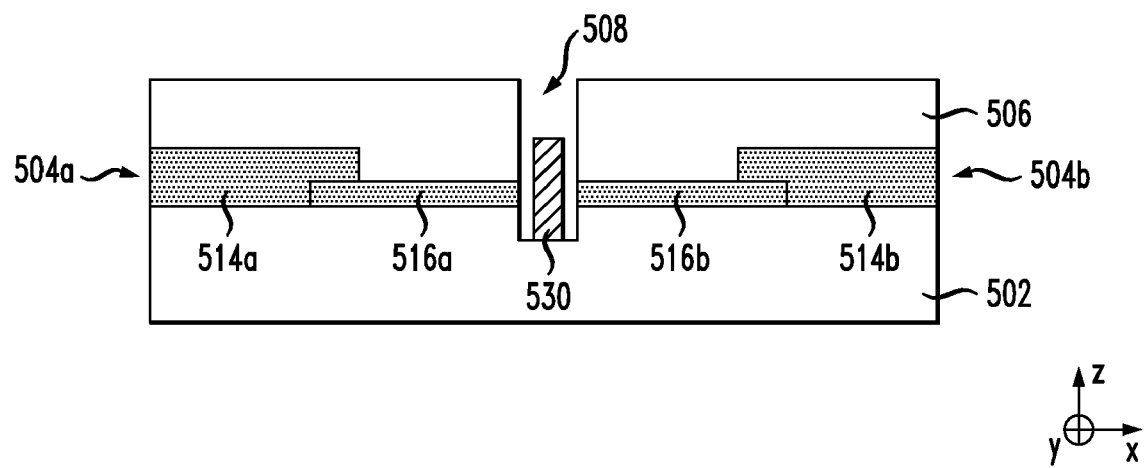

FIGS. 5A-B show top and cross-sectional views, respectively, of a polarization rotator 500 that can be used in filter 100 or 300 according to another embodiment of the invention. Polarization rotator 500 is generally analogous to polarization rotator 400 (FIG. 4), and analogous elements of the two structures are designated with labels having the same last two digits. However, one difference between polarization rotators 400 and 500 is that, in the former, the transverse cross-section of core region 404 has a constant shape and area, while, in the latter, the transverse cross section of core region 504 is a function of coordinate X. HWP 530 of polarization rotator 500 can be used as one of HWPs 130a-b (FIG. 1) or in HWP 330 (FIG. 3).

Core-region portion 504a is composed of two partially overlapping tapered sections 514a and 516a. Similarly, core-region portion 504b is composed of two partially overlapping tapered sections 514b and 516b. In various embodiments, the materials used for making sections 514 and 516 can be the same or different.

As shown in FIG. 5A, the width (i.e., size along the Y axis) of each of sections 514 and 516 decreases as the location of the cross section where the width measurement is taken gets closer to HWP 530. In one embodiment, each of sections 514 and 516 is linearly tapered, e.g., the section's width is a linear function of coordinate X over a range of X. In addition, as shown in FIG. 5B, sections 514 and 516 have different thicknesses (i.e., sizes along the Z axis), with section 514 being thicker than section 516. In one embodiment, the thicknesses of sections 514 and 516 are about 200 and 50 nm, respectively.

The combined effect of the above-described geometric features is that the cross-section area of each of core-region portions 504a-b within a plane parallel to the YZ plane generally decreases (except at the point where section 514 joins section 516) as the location of the cross section gets closer to HWP 530. A change in the cross-section area of core region 504 causes a corresponding change in the effective cross-section area of an optical beam that travels through the waveguide of polarization rotator 500. One skilled in the art will appreciate that the energy of an optical beam guided by an optical waveguide is generally distributed between the core and the cladding, with the manner of the distribution depending on the optical properties of the core and cladding materials and the waveguide's geometry. The term "effective cross-section area" used herein refers to an area of the guided beam that contains a specified amount, e.g., 95%, of the beam's energy, which area may include portions of the cladding in addition to the core.

If an optical beam is applied to section 514a, then, due to the above-described geometric features, the beam's effective cross-section area gradually increases as the beam propagates toward trench 508. When the optical beam enters the free space of trench 508, it further expands due to the absence of waveguiding structures in the trench. Upon traversing trench 508 and HWP 530, the optical beam partially couples into the optical waveguide portion having core-region portion 504b as its core. However, part of the optical energy is lost because it is reflected, scattered, and/or otherwise unable to couple into that waveguide portion. The effective cross-section area of the optical beam that has coupled into the optical waveguide portion having core-region portion 504b gradually decreases as the beam propagates away from trench 508.

For at least the following reasons, optical coupling losses in polarization rotator 500 are lower than those in comparably sized polarization rotator 400 (FIG. 4). First, due to the fact that the beam has already expanded while traveling through sections 514a and 516a, the relative amount of beam expansion in trench 508 is smaller than that in trench 408. In addition, at the trench/waveguide interface, the area from which the waveguide having section 516b as a core can couple light into the waveguide mode(s) is larger than the area from which the waveguide having core region 404b as a core can do the same.

Figure 6A:
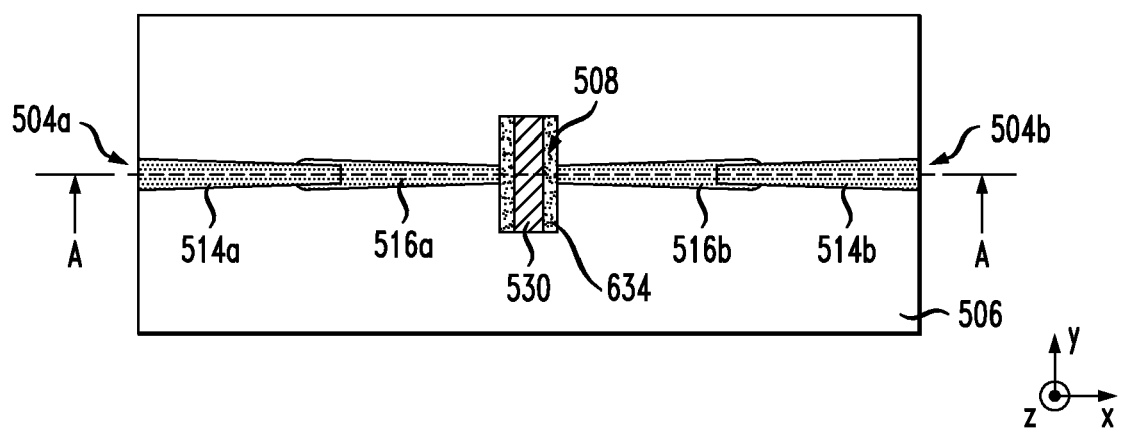
FIGS. 6A-B show top and cross-sectional views, respectively, of a polarization rotator that can be used in the filter of FIG. 1 or FIG. 3 according to yet another embodiment of the invention.
Figure 6B:
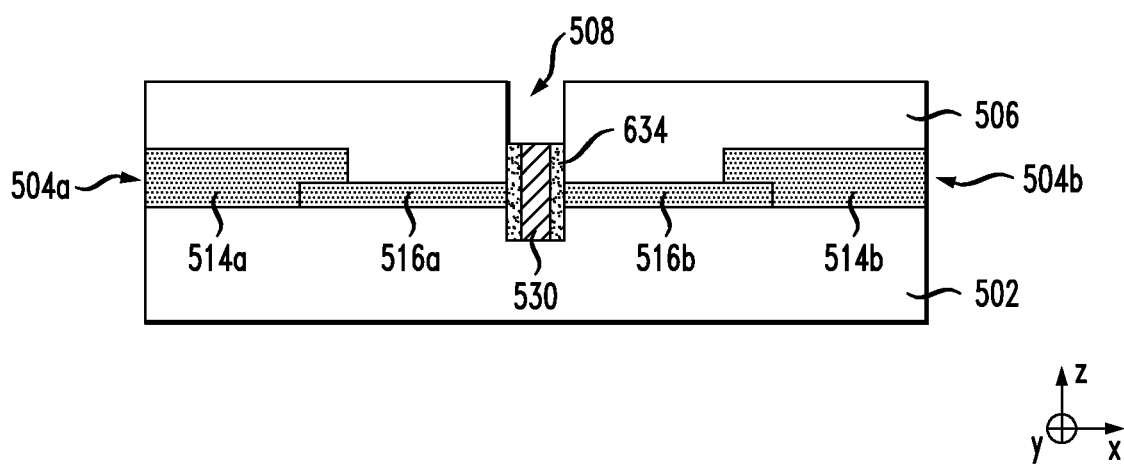

FIGS. 6A-B show top and cross-sectional views, respectively, of a polarization rotator 600 that can be used in filter 100 or 300 according to yet another embodiment of the invention. Polarization rotator 600 is similar to polarization rotator 500 (FIG. 5) and has many of the same structural elements. However, one difference between polarization rotators 500 and 600 is that, in the latter, the gaps between HWP 530 and the walls of trench 508 are at least partially filled with an optically transparent dielectric 634. The presence of dielectric 634 reduces the optical-beam expansion in trench 508 in polarization rotator 600 compared to that in polarization rotator 500. As a result, polarization rotator 600 has even lower optical coupling losses than polarization rotator 500. In one embodiment, dielectric 634 is a polymer whose index of refraction has an intermediate value between the indices of refraction of the materials of core section 516 and cover layer 506. In another embodiment, dielectric 634 is silicon nitride.

Figure 7:
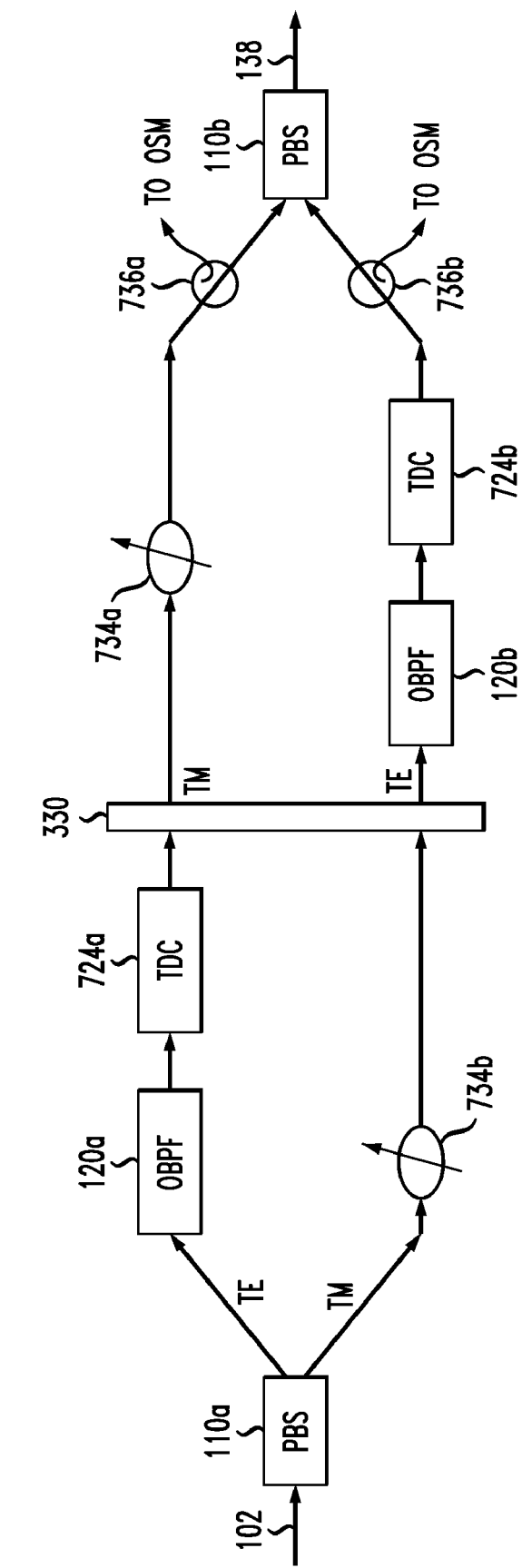
FIG. 7 shows a block diagram of an optical polarization-diverse filter according to yet another embodiment of the invention.

FIG. 7 shows a block diagram of an optical polarization-diverse filter 700 according to yet another embodiment of the invention. Filter 700 is generally similar to filter 100 (FIG. 1) and filter 300 (FIG. 3) and has many of the same elements. In addition, filter 700 has tunable dispersion compensators 724a-b and variable optical attenuators 734a-b. Dispersion compensators 724a-b serve to reduce possible adverse effects of polarization mode dispersion or differential group delay between the TE and TM modes. Variable optical attenuators 734a-b serve to equalize or adjust as necessary the optical power of the TE and TM modes in output signal 138. Optical taps 736a-b coupled to an optical signal monitor (OSM, not explicitly shown in FIG. 7) are used to appropriately configure and then adjust if necessary the settings of dispersion compensators 724a-b and optical attenuators 734a-b.

Various embodiments of tunable optical bandpass filters of the invention advantageously provide some or all of the following benefits. A filter of the invention can be implemented in a single integrated CMOS circuit, which makes the filter amenable to large-volume and low-cost production. An added benefit of the CMOS compatibility is that the relatively high refraction-index contrast of silicon/silicon oxide optical waveguides enables relatively high packing densities of circuit components, which leads to advantageously compact devices. The filter is capable of providing a box-like filter response with its bandwidth tunable from about 20 GHz to over 100 GHz. The box-like filter response is achieved with cascaded OBPFs of relatively low order (e.g., fourth or sixth), which reduces the overall filter complexity compared to that of functionally comparable prior-art filters. The use of OBPFs specifically designed for processing TE-polarized signals further enables the filter to be relatively compact and to consume relatively little power for tuning. The filter supports polarization diversity while being capable of providing relatively low optical losses due to the use of a specially designed polarization rotator.

If implemented in CMOS silicon, a filter of the invention is generally capable of supporting full C-band (1525-1565 nm) tunability because the relatively high refraction-index contrast of silicon/silicon oxide waveguides can be used to create and utilize OBPFs with relatively large FSRs. More specifically, one skilled in the art will appreciate that a filter that can be tuned over the entire C-band requires a corresponding relatively large FSR. As indicated above in reference to FIG. 2, the filter's FSR is determined by its resonator-ring's round trip delay, with smaller round trip delays corresponding to larger FSRs. Since a typical practical implementation of a tunable resonator ring entails (i) imbedding a tunable coupler between the interferometer arm and the resonator ring and (ii) inserting a phase shifter into the resonator ring, the minimum achievable physical length of the resonator ring is limited by the combined size of the coupler and the shifter. However, embodiments of the invention overcome the problems associated with this size limitation by taking advantage of the higher group index of the TE mode compared to the group index of the TM mode. In particular, the group index of the TE mode is sufficiently high to enable construction of compact resonator rings that meet the FSR requirements for full C-band tunability.

While polarization-diverse filters of the invention have been described in reference to OBPFs designed to process TE-polarized signals, the invention is not so limited. One skilled in the art will recognize that a polarization-diverse filter employing OBPFs designed to process TM-polarized signals can similarly be constructed. For example, such a filter can have a layout similar to that shown in FIG. 1, wherein (1) PBS 110*a* is reconfigured to apply TM- and TE-polarized signals to OBPF 120*a* and HWP 130*b*, respectively, and (2) PBS 110*b* is reconfigured to receive TE- and TM-polarized signals from HWP 130*a* and OBPF 120*b*, respectively. The filter layout of FIG. 3 can be modified in a similar fashion to adapt it for OBPFs designed to process TM-polarized signals.

While this invention has been described with reference to illustrative embodiments, this description is not intended to be construed in a limiting sense. Although a representative filter of the invention has been described with respect to possible implementation as a single integrated circuit, it can also be implemented as a multi-chip module, a single card, or a multi-card circuit pack. Various geometries can be used to create suitable core-region tapering in addition to or instead of those shown in FIGS. 5-6. For example, two or more steps between three or more core sections can be used to create a taper in the Z direction. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on. Similarly, while all figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. An optical device, comprising:
a first optical filter adapted to apply bandpass filtering to a first component of an optical input signal to produce a first filtered signal, wherein said first component has a first polarization;
one or more polarization rotators adapted to change (i) the first polarization of the first filtered signal to a different second polarization and (ii) the second polarization of a second component of the optical input signal to the first polarization; and
a second optical filter adapted to apply bandpass filtering to the second component having the resulting first polarization to produce a second filtered signal, wherein the optical device is adapted to combine the first and second filtered signals to produce a filtered output signal, wherein at least one of the first and second optical filters comprises:
a first optical bandpass filter having a first free spectral range (FSR); and
a second optical bandpass filter having a different second FSR and connected in series with the first optical bandpass filter so that an output port of the first optical bandpass filter is connected to an input port of the second optical bandpass filter.

2. The invention of claim 1, further comprising:
a first polarization beam splitter adapted to split the optical input signal into the first component having the first polarization and the second component having the second polarization;
a second polarization beam splitter adapted to combine the first and second filtered signals to produce the filtered output signal.

3. The invention of claim 1, further comprising:
one or more variable optical attenuators adapted to control relative optical power of the first and second filtered signals; and
one or more dispersion compensators capable of changing differential group delay between the first and second filtered signals.

4. The invention of claim 1, wherein:
the first polarization is one of a transverse electric (TE) polarization and a transverse magnetic (TM) polarization; and
the second polarization is the other one of the TE and TM polarizations.

5. The invention of claim 1, wherein at least two of the one or more polarization rotators are parts of a single half-wave plate.

6. The invention of claim 1, wherein the one or more polarization rotators comprise:
   a first half-wave plate adapted to change the first polarization of the first filtered signal to the second polarization; and
   a second half-wave plate adapted to change the second polarization of the second signal component to the first polarization.

7. The invention of claim 1, wherein:
   a selected transmission band of the first optical bandpass filter is spectrally aligned with a selected transmission band of the second optical bandpass filter.

8. The invention of claim 1, wherein at least one of the first and second optical bandpass filters comprises:
   a Mach-Zehnder interferometer having first and second interferometer arms, both coupled between two optical couplers;
   a first plurality of optical resonators, each coupled to the first interferometer arm; and
   a second plurality of optical resonators, each coupled to the second interferometer arm, wherein:
      each of the first and second pluralities comprises three optical resonators;
      each optical resonator comprises a tunable phase shifter; and
      said at least one of the first and second optical bandpass filters further comprises, for each optical resonator, a tunable optical coupler adapted to control optical coupling strength between the optical resonator and the corresponding interferometer arm.

9. The invention of claim 1, wherein at least one of the one or more polarization rotators comprises:
   an optical waveguide having a core and a cladding; and
   a half-wave plate placed in an opening formed in said core and said cladding and adapted to perform at least one of said polarization changes.

10. The invention of claim 9, wherein:
    said optical waveguide is part of a planar waveguide circuit;
    said opening divides said core into first and second core portions;
    at least one of the first and second core portions comprises:
       a first core section adjacent to said opening and having a first size along a direction orthogonal to the plane of the planar waveguide circuit; and
       a second core section connected in series with the first core section and having a second different size along said direction.

11. The invention of claim 10, wherein the first size is smaller than the second size.

12. The invention of claim 10, wherein, for at least one of the first and second core sections, a cross-section area of the core section varies as a function of distance from said opening.

13. The invention of claim 12, wherein, for each of the first and second core sections, the corresponding cross-section area decreases with a decrease in said distance.

14. The invention of claim 9, wherein said at least one polarization rotator further comprises a dielectric material that at least partially fills said opening.

15. The invention of claim 14, wherein said dielectric material has an index of refraction of intermediate value between an index of refraction of said core and an index of refraction of said cladding.

16. The invention of claim 9, wherein:
    said core comprises silicon; and
    said cladding comprises silicon oxide.

17. The invention of claim 1, wherein the device is a single integrated CMOS circuit.

18. The invention of claim 1, wherein the device has a filter response that is substantially independent of the polarization of the optical input signal.

19. The invention of claim 1, wherein each of the first and second optical filters comprises:
    a respective first optical bandpass filter having the first FSR; and
    a respective second optical bandpass filter having the second FSR and connected in series with said respective first optical bandpass filter so that an output port of said respective first optical bandpass filter is connected to an input port of said respective second optical bandpass filter.

20. A method of processing optical signals, comprising:
    applying bandpass filtering to a first component of an optical input signal to produce a first filtered signal, wherein said first component has a first polarization;
    changing the first polarization of the first filtered signal to a different second polarization;
    changing the second polarization of a second component of the optical input signal to the first polarization;
    applying bandpass filtering to the second component having the resulting first polarization to produce a second filtered signal; and
    combining the first and second filtered signals to produce a filtered output signal, wherein at least one of the applying steps comprises passing the respective component through (i) a first optical bandpass filter having a first free spectral range (FSR) and (ii) a second optical bandpass filter having a different second FSR and connected in series with the first optical bandpass filter so that an output port of the first optical bandpass filter is connected to an input port of the second optical bandpass filter.

* * * * *